(12) United States Patent
Kim et al.

(10) Patent No.: US 7,677,794 B2
(45) Date of Patent: Mar. 16, 2010

(54) MULTI-FIXED-POINT CELLS AND TEMPERATURE CALIBRATION SYSTEM USING IT

(75) Inventors: Yong-gyoo Kim, Seo-gu (KR); Inseok Yang, Yuseong-gu (KR); Kee sool Gam, Yuseong-gu (KR); Kee hoon Kang, Yuseong-gu (KR)

(73) Assignee: Korea Research Institute of Standards and Science, Daejeon (KR)

( * ) Notice: Subject to any disclaimer, the term of this patent is extended or adjusted under 35 U.S.C. 154(b) by 168 days.

(21) Appl. No.: 11/717,821

(22) Filed: Mar. 14, 2007

(65) Prior Publication Data

US 2008/0013591 A1 Jan. 17, 2008

(30) Foreign Application Priority Data

Jul. 13, 2006 (KR) ...................... 10-2006-0065698

(51) Int. Cl.
*G01K 15/00* (2006.01)
(52) U.S. Cl. .................. 374/1; 374/3; 702/99; 702/104
(58) Field of Classification Search ...................... 374/3, 374/1; 702/99, 104
See application file for complete search history.

(56) References Cited

U.S. PATENT DOCUMENTS 4,523,859 A * 6/1985 Bonnier et al. .................. 374/1
5,219,225 A * 6/1993 Ball ............................... 374/1
5,833,366 A * 11/1998 Ma ............................... 374/26
6,193,411 B1 * 2/2001 Chen .............................. 374/2
6,293,695 B1 * 9/2001 Schmermund .................. 374/1
6,663,277 B1 * 12/2003 Sandmael ...................... 374/3
2007/0206653 A1 * 9/2007 Nakano et al. ................. 374/1
2007/0291814 A1 * 12/2007 Hirst ............................. 374/1

FOREIGN PATENT DOCUMENTS

JP 57088330 A * 6/1982

* cited by examiner

*Primary Examiner*—Gail Verbitsky
*Assistant Examiner*—Mirellys Jagan
(74) *Attorney, Agent, or Firm*—The Webb Law Firm (57) ABSTRACT

The present invention relates to a multi fixed-point cell for calibrating a thermometer and a thermometer calibration apparatus using the same, wherein measuring errors can be checked by using a property of constant temperature of a metal on the basis of a phase transition and wide range of temperature region can be measured by one time calibration, thereby capable of increasing efficiencies of time and cost which are taken for calibration. In a multi fixed-point cell for calibrating a thermometer according to the present invention, a thermometer inserting hole in which a thermometer is inserted is formed at one side and at least two reference material inserting holes in which reference materials having different phase transition temperatures are inserted respectively are formed on a same plane as that of the thermometer inserting hole so as to be spaced apart each other.

4 Claims, 6 Drawing Sheets

[Figure 1]

PRIOR ART

[Figure 2]

PRIOR ART

MULTI-FIXED-POINT CELLS AND TEMPERATURE CALIBRATION SYSTEM USING IT

TECHNICAL FIELD

The present invention relates to a multi fixed-point cell for calibrating a thermometer and a thermometer calibration apparatus using the same, wherein measuring errors can be checked by using a property of constant temperature of a metal on the basis of a phase transition and wide range of temperature region can be measured by one time calibration, thereby capable of increasing efficiencies of time and cost which are taken for calibration.

BACKGROUND ART

A thermometer is an instrument for measuring temperature by measuring a thermodynamic property of an object, specifically by measuring variation in resistance according to thermal expansion or temperature, or by measuring thermoelectromotive force varied according to temperature, and the thermometer, in particular an industrial thermometer requires high accuracy. Industrial fields using the thermometer are a power plant, a large storage, a steel industry such as a coke plant and a plating plant, and etc, and the thermometer is used in various industrial fields.

In the case that the thermometer is used in an industrial installation as above mentioned, the thermometer is required to have accurate performance as temperature is necessary to be displayed at all times in the industrial installation and a defective product may be manufactured even by a minute error in temperature, therefore regular check for the thermometer should be carried out. However, in a conventional industrial thermometer, there is a disadvantage of great loss due to holding of process as the thermometer is detached from the industrial installation and transferred to a laboratory so as to be checked in order to calibrate the thermometer.

Figure 1:
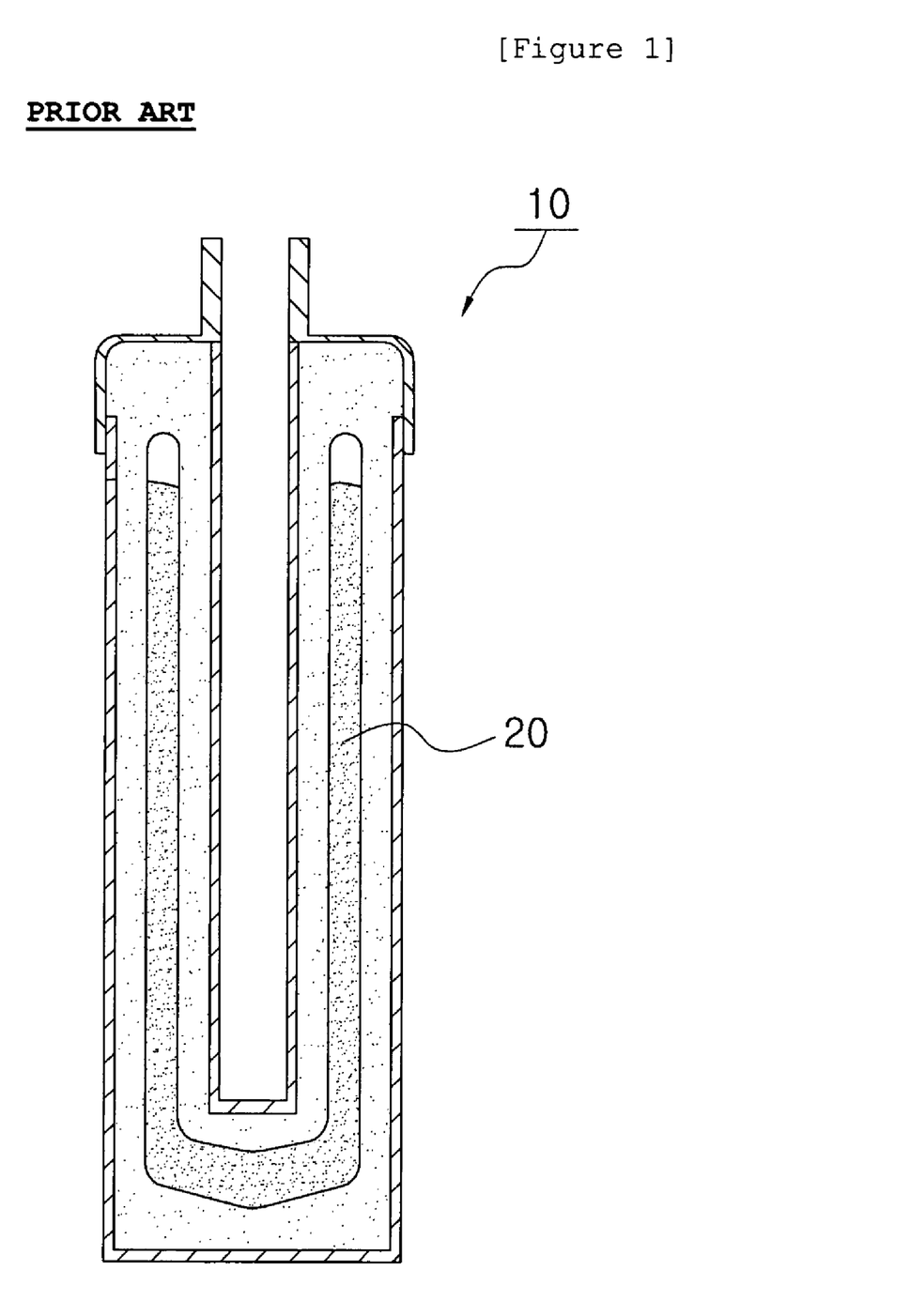
FIG. 1 is a sectional view showing a conventional fixed-point cell.
Figure 2:
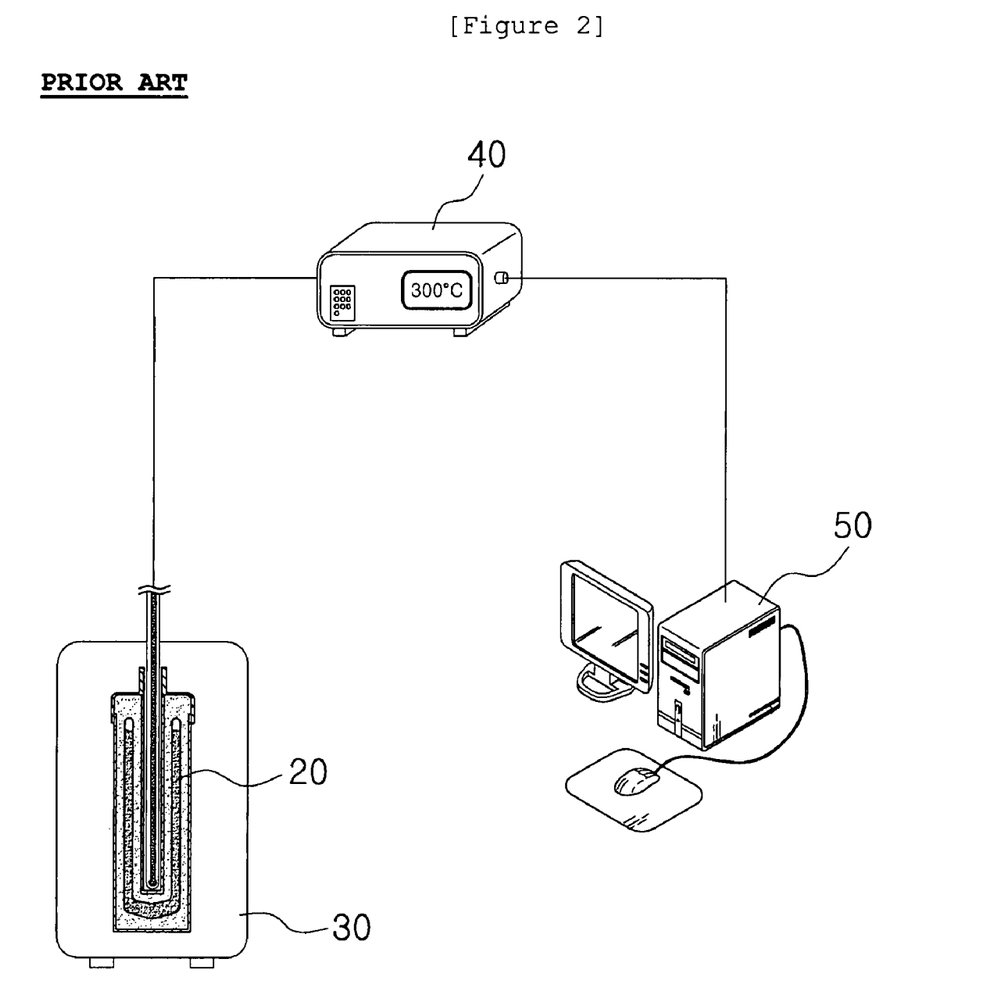
FIG. 2 is a schematic diagram showing a full system of a thermometer calibration apparatus using the fixed-point cell in FIG. 1.

The calibration of the thermometer is largely divided into a method using a reference thermometer and a method using a fixed-point, and the present invention relates to the method using a fixed-point; as an example of a thermometer calibration apparatus using the fixed-point, FIG. 1 is a sectional view showing a conventional fixed-point cell and FIG. 2 is a schematic diagram showing full system of a thermometer calibration apparatus using the fixed-point cell in FIG. 1. As shown, the conventional calibration apparatus includes a fixed-point cell 10 having a thermal contact with a thermometer which is contactably inserted therein and enclosing a reference temperature material layer 20 which represents a reference temperature on the basis of a phase transition of coexisting two-phases or three-phases; a heater 30 into which the fixed-point cell 10 is inserted and heated so as to derive the phase transition; a temperature indicator 40 connected to a lead line of the thermometer for displaying a temperature measured by the thermometer with respect to the reference temperature material layer 20; a computer 50 electrically connected to the temperature indicator 40 in which reference temperatures and reference deviations with respect to each constant temperature section are stored so as to compare a difference between the reference temperature of the constant temperature section formed by the phase transition and the measured temperature and to the reference deviation, and decide whether the thermometer has detects according as whether the difference exceeds the reference deviation or not.

However, the conventional calibration apparatus using a fixed-point as above mentioned is provided with one reference temperature material layer and thus there are disadvantages that great time should be taken for measuring temperatures of wide region of many points as it takes about two days for full calibration in which a thermometer is heated by the heater of the calibration apparatus and then cooled for measuring temperature of one region, and a temperature error due to external heat is generated. Further, there exists disadvantage that in an industrial field in which the thermometer is used, manufacturing cost is increased by holding of process as it takes great time to calibrate the thermometer.

DISCLOSURE OF THE INVENTION

It is an object of the present invention to provide a multi fixed-point cell for calibrating a thermometer and a thermometer calibration apparatus using the same, wherein as it is possible to set temperature of calibration region which a user desires and to carry out calibration in wide temperature region which a user desires at one time calibrational examination, time which is taken for the calibrational operation can be remarkably shortened thereby minimizing industrial losses by checking of the thermometer.

It is another object of the present invention to provide a multi fixed-point cell for calibrating a thermometer and a thermometer calibration apparatus using the same, wherein it is possible to prevent generation of error in measured temperature due to radiant heat, and thus it is possible to calibrate the thermometer accurately, save calibrational cost and increase efficiency of the calibrational operation.

Hereinafter, the present invention is described in detail.

In a multi fixed-point cell for calibrating a thermometer according to the present invention, a thermometer inserting hole in which a thermometer is inserted is formed at one side and at least two reference material inserting holes in which reference materials having different phase transition temperatures are inserted respectively are formed on a same plane as that of the thermometer inserting hole so as to be spaced apart each other.

Further, the reference materials in the reference material inserting holes are successively inserted in sequence from a material having a high phase transition temperature to a material having a low phase transition temperature, and the multi fixed-point cell for calibrating a thermometer is made of high pure graphite.

In addition, the thermometer inserting hole is formed at a center of the cell and the reference material inserting holes are formed around the thermometer inserting hole, and depths of the thermometer inserting hole and the reference material inserting holes are 80 to 100 mm on the same plane.

A thermometer calibration apparatus using a multi fixed-point cell according to the present invention includes an external tub having a lid; a multi fixed-point cell for calibrating a thermometer enclosedly inserted into the external tub and having a thermometer inserting hole in which an internal tub is contactably inserted, the multi fixed-point cell having a thermal contact with the internal tub, and a reference material inserting hole in which a reference material representing a reference temperature on the basis of a phase transition is sealingly enclosed; the thermometer enclosedly inserted into the internal tub; a temperature control means for heating or cooling the external tub which is introduced therein so as to derive the phase transition; a temperature display part connected to the thermometer, for displaying a temperature measured by the thermometer; and a computer connected to the thermometer, for comparing and storing a difference between a reference temperature of the each reference material and a temperature measured by the thermometer in a constant temperature section according to the phase transition of the reference material and deciding error of the thermometer according to the difference between the two.

In addition, there may be further provided a radiation block plate which is provided around the internal tub inside of the external tub and blocks heat transferred to the thermometer and a gas regulating part which is provided at a side of the external tub and supplies or discharges gas, and the gas is an inert gas.

DETAILED DESCRIPTION OF MAIN ELEMENTS

100: multi fixed-point cell
110: thermometer inserting hole
120: reference material inserting hole
130: cap for the reference material inserting hole
200: external tub
210: lid
220: radiation blocking plate
230: gas regulating part
240: internal tub
300: temperature control means
400: temperature display part
500: computer
1000: thermometer
2000: reference material

BEST MODE FOR CARRYING OUT THE INVENTION

Practical and presently preferred embodiments of the present invention are illustrative as shown in the following Examples and Comparative Examples.

However, it will be appreciated that those skilled in the art, on consideration of this disclosure, may make modifications and improvements within the spirit and scope of the present invention.

Figure 3:
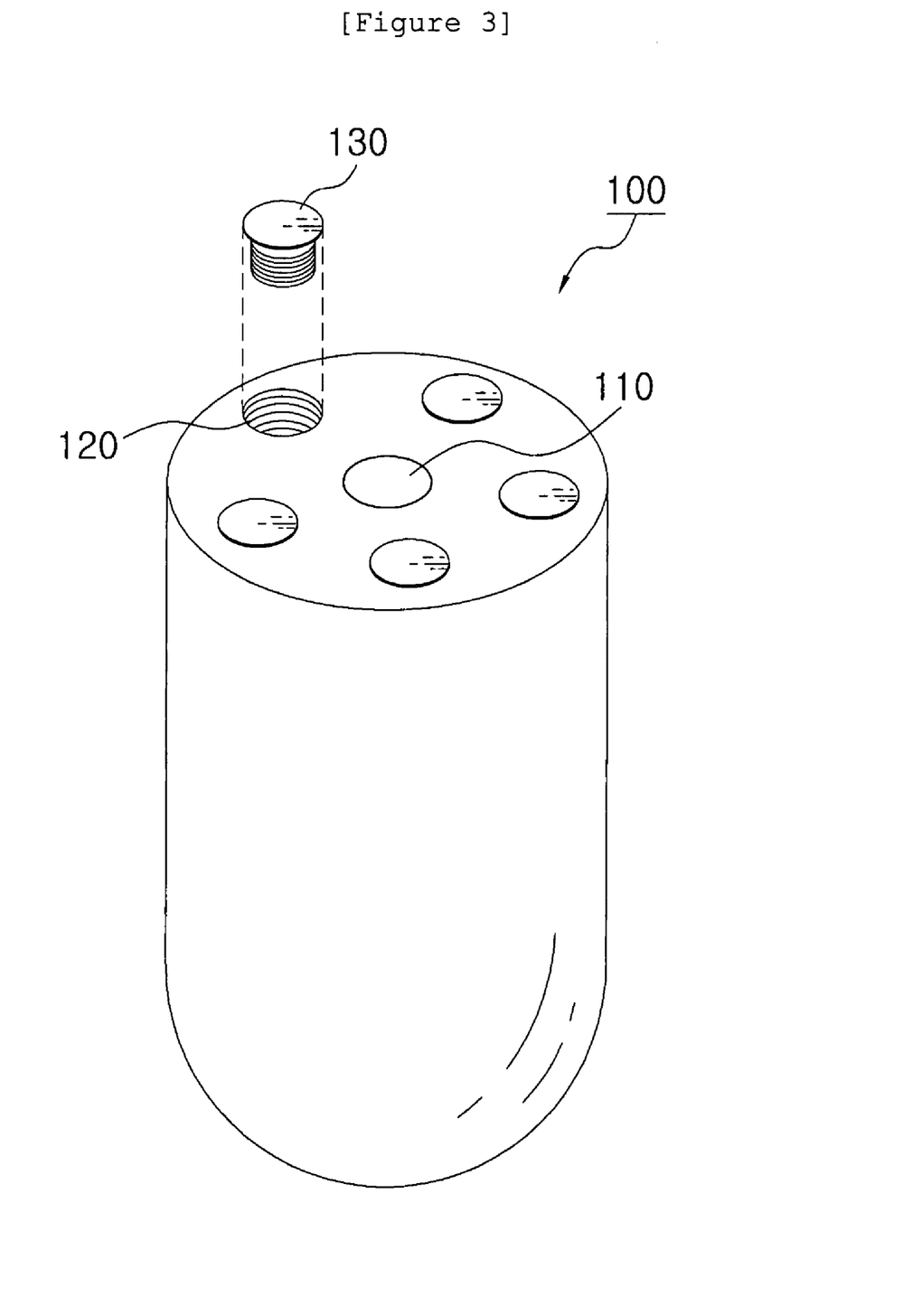
FIG. 3 is a perspective view illustrating a multi fixed-point cell for calibrating a thermometer according to the present invention.

FIG. 3 is a perspective view illustrating a multi fixed-point cell 100 for calibrating a thermometer according to the present invention, and as shown, a thermometer inserting hole 110 into which a thermometer 1000 is inserted is formed at a side of the multi fixed-point cell 100 for calibrating a thermometer according to the present invention and reference material inserting holes 120 are formed at the same plane as that of the thermometer inserting hole 110 so as to be spaced apart, and at least two reference materials 2000, which represent reference temperatures on the basis of phase transition and have different phase transition temperatures, are enclosed respectively in the reference material inserting holes 120.

It is preferable that the multi fixed-point cell 100 for calibrating a thermometer is made of high pure graphite. The graphite is a material having high thermal conductivity and is adapted to the multi fixed-point cell 100 for calibrating a thermometer according to the present invention which should have uniform temperature distribution.

In the thermometer inserting hole 110 are inserted a inner tub 240, into which the thermometer 1000 is inserted, and the thermometer 1000, and the thermometer 1000 is heated or cooled together with the reference material 2000 by a temperature control means 300 provided at an outside portion, and the thermometer 1000 measures a temperature of a constant temperature section according to a phase transition of the reference material 2000, and thus calibration of the thermometer 1000 is carried out by comparing the reference temperature of the reference material 2000 with the temperature measured by the thermometer 1000.

The reference material 2000 is a high pure metal and a single metal such as zinc, tin and aluminum, or an alloy may be used as the reference material. The reference material 2000 is a material which is a reference of international temperature standard, and at least two reference materials 2000 having different phase transition temperatures which may become references are inserted in the reference material inserting holes 120.

According to a number and a kind of the reference material 2000 filled in the reference material inserting holes 120, a thermometer 1000 calibration apparatus using the multi fixed-point cell 100 according to the present invention can calibrate in much wider temperature region by one time calibrational operation.

In the case that a user calibrates the thermometer 1000 in temperature range of 400 to 1350° C., Zn, Al, Ag, Cu, Fe—C and Co—C may be used as metals to be filled in the reference material inserting holes 120, and in the case that a user calibrates the thermometer 1000 in temperature range of room temperature to 962° C., Ga, In, Sn, Zn, Al and Ag may be filled in the reference material inserting holes 120.

The reference materials 2000 in the reference material inserting holes 120 are preferably inserted in sequence from a material having high phase transition temperature to a material having low phase transition temperature. The multi fixed-point cell 100 for calibrating the thermometer is heated by the temperature control means 300, then a reference material 2000 in liquid phase having the highest phase transition temperature is filled, then a reference material 2000 having the next highest phase transition temperature is filled, other materials are also filled in such sequence and then temperature is lowered, whereby there is an advantage that it is capable of preventing a reference material which is already filled from being melted when the next reference material is filled.

The reference material inserting holes 120 are sealed by using a reference material inserting hole cap 130 so that the reference materials 2000 are not leaked out after the reference materials 2000 are inserted into the reference material inserting holes 120.

FIG. 3 illustrates an embodiment in which the thermometer inserting hole 110 is formed at a center of the multi fixed-point cell 100, the reference material inserting holes 120 are formed around the thermometer inserting hole 110 and a number of the reference material inserting holes 120 is six. The number of the reference material inserting holes 120 may be varied according to temperature region which a user requires, and it is preferable that spaces between the thermometer inserting hole 110 and the reference material inserting holes 120 are regular so as to uniformly transfer the variation according to the temperature variation, and depths of the thermometer inserting hole 110 and the reference material inserting holes 120 are 80 to 100 mm on the same plane.

Generally, a diameter of the thermometer inserting hole 110 is 5 to 15 mm, a diameter of the reference material inserting hole 120 is 5 to 10 mm, and it is preferable that a space between the thermometer inserting hole 110 and the reference material inserting hole 120 is 5 to 10 mm, however it should be noted that the present invention is not limited to the above mentioned embodiment and it may be variable according to size of the thermometer 1000 which is inserted into the thermometer inserting hole 110, kind of the reference material which is inserted into the reference material inserting hole 120 and a calibration environment.

Figure 4:
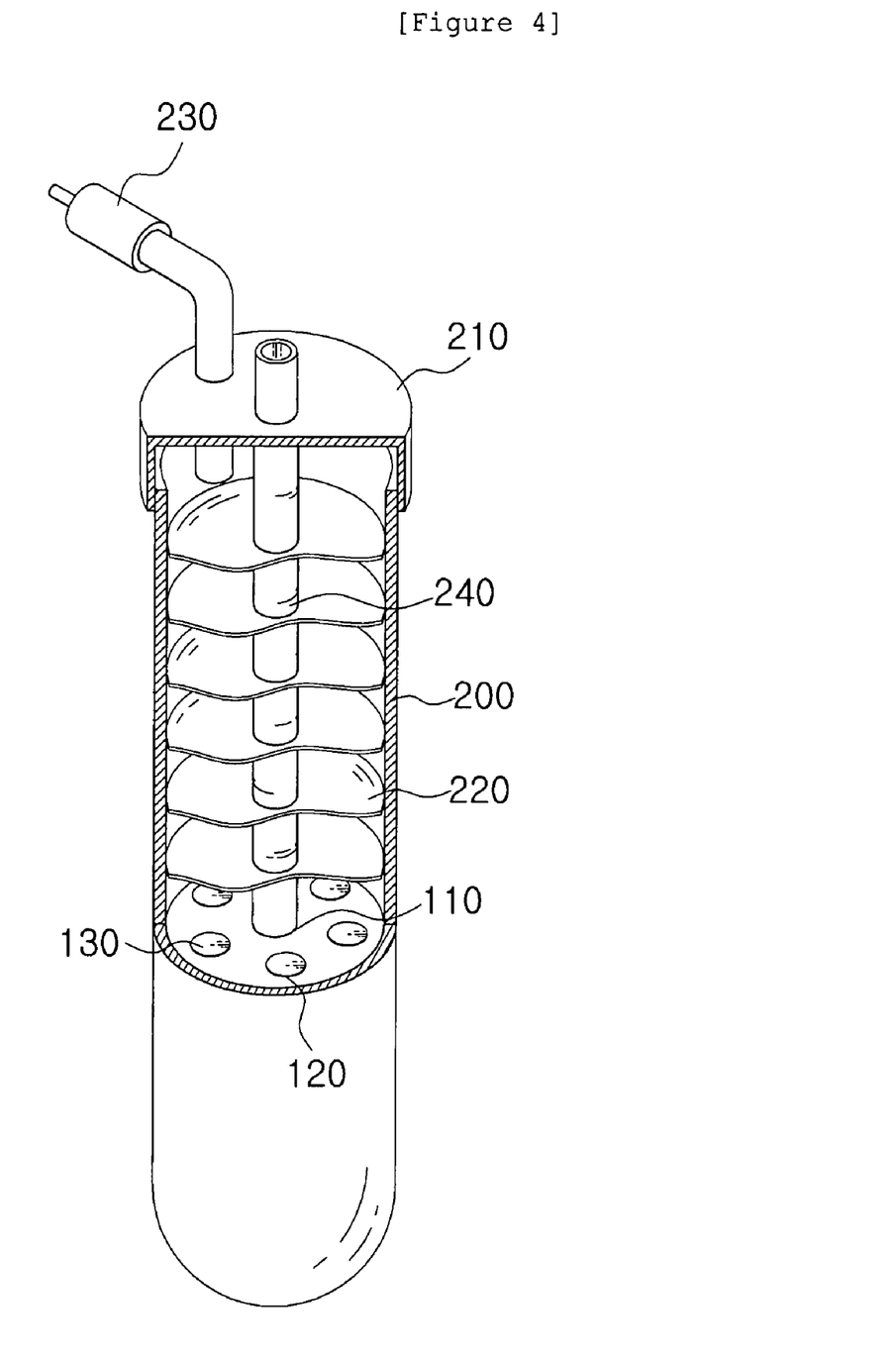
FIG. 4 is a perspective view partially illustrating a thermometer calibration apparatus according to the present invention.
Figure 5:
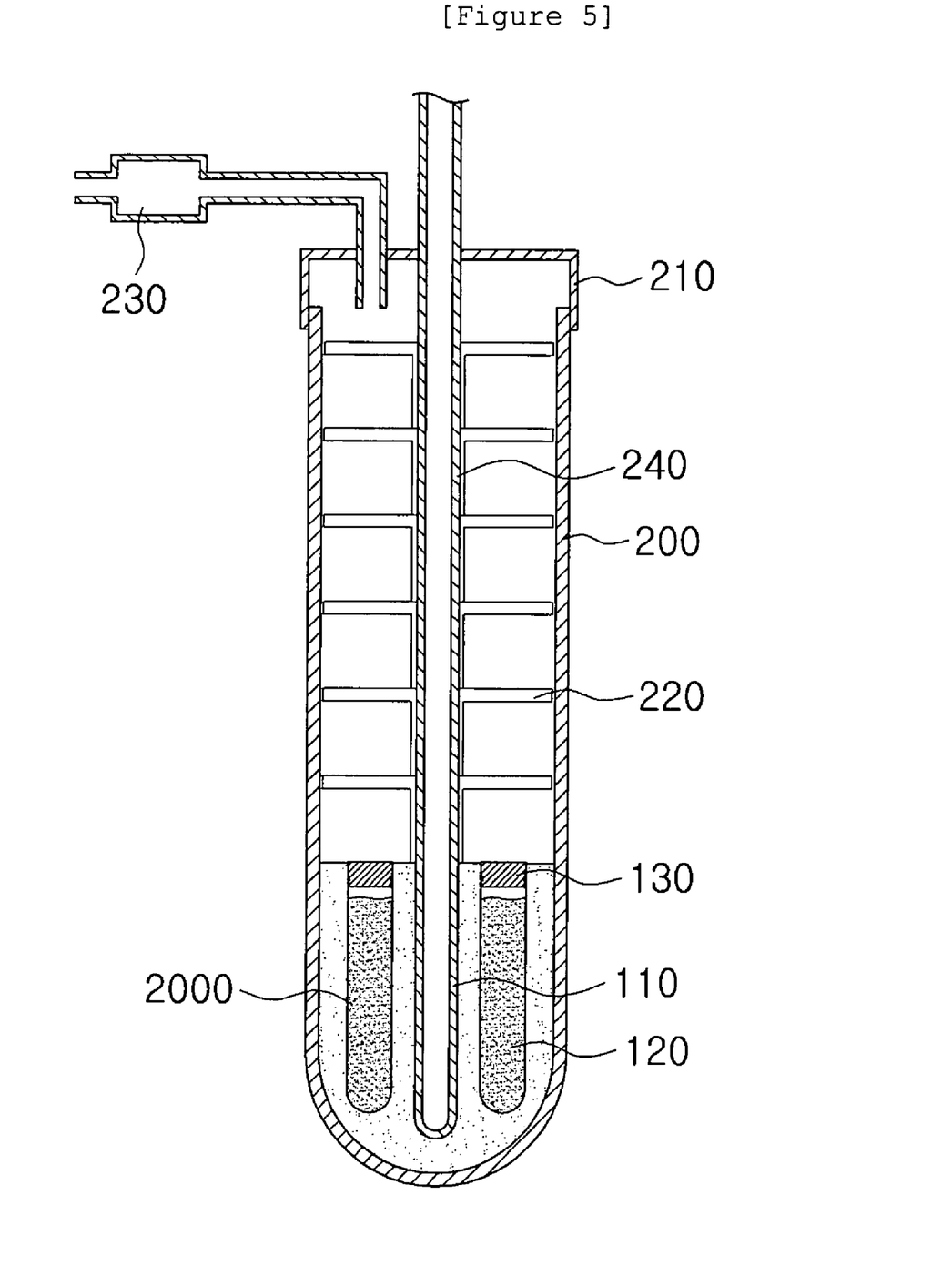
FIG. 5 is a sectional view partially illustrating the thermometer calibration apparatus according to the present invention in FIG. 4.
Figure 6:
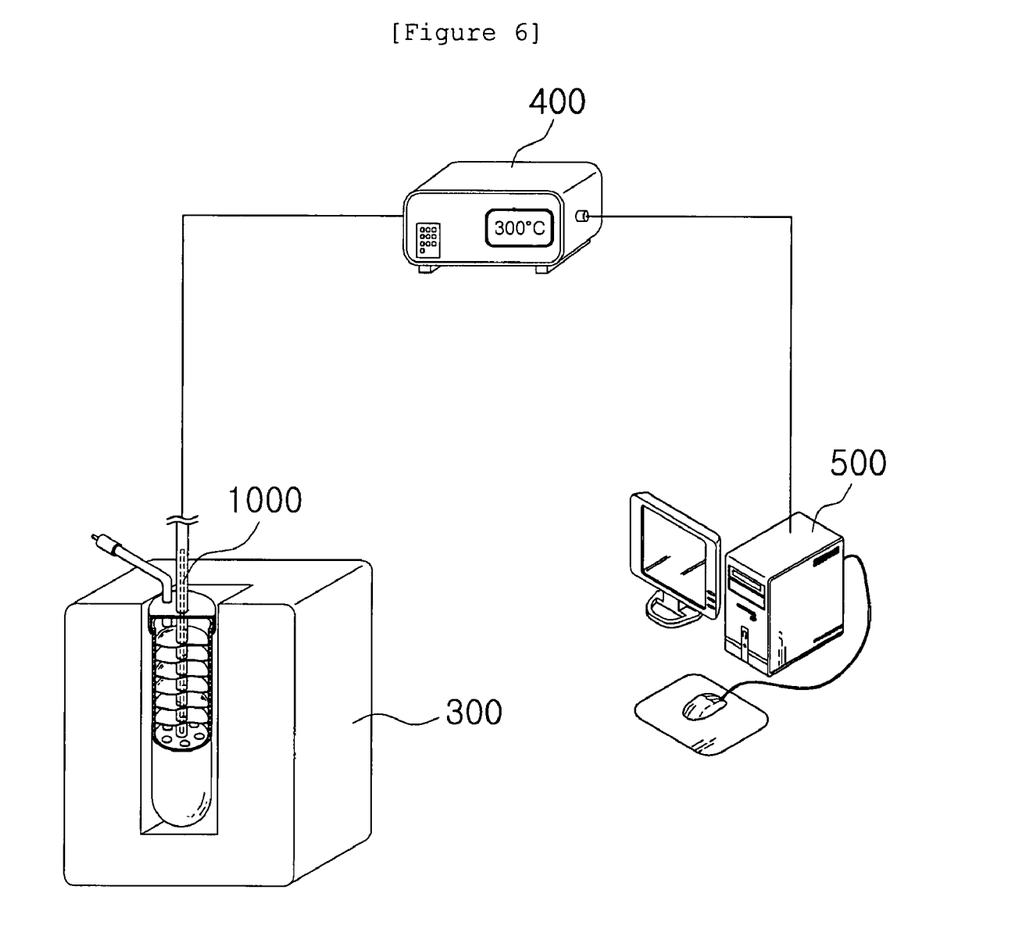
FIG. 6 is a schematic diagram illustrating a full system of the thermometer calibration apparatus according to the present invention.

FIG. 4 is a perspective view partially illustrating a thermometer 1000 calibration apparatus according to the present invention, FIG. 5 is a sectional view partially illustrating the thermometer 1000 calibration apparatus according to the present invention in FIG. 4, and FIG. 6 is a schematic diagram illustrating a full system of the thermometer 1000 calibration apparatus according to the present invention.

As shown, the thermometer 1000 calibration apparatus according to the present invention includes an external tub 200 provided with a lid 210; a multi fixed-point cell 100 for calibrating a thermometer enclosedly inserted into the external tub 200; the thermometer 1000; a temperature control means 300 for controlling a temperature in which the external tub 200 is introduced; a temperature display part 400 connected to the thermometer 1000, for displaying a temperature measured by the thermometer 1000; and a computer 500 for comparing and storing the temperature measured by the thermometer 1000 and a phase transition temperature of a reference material 2000, and an embodiment of the thermometer 1000 calibration apparatus using the multi fixed-point cell 100 for calibrating a thermometer according to the present invention shown in FIG. 4 to FIG. 6 is further provided with a radiation blocking plate 220 and a gas regulating part 230.

The external tub 200 is inserted into the temperature control means 300 and provided with the multi fixed-point cell 100 for calibrating a thermometer therein. The external tub 200 is provided with the lid 210 thereby being blocked from contact with an external portion.

The multi fixed-point cell 100 for calibrating a thermometer has the feature as above mentioned and has a thermal relationship with respect to the internal tub 240, which is contactably inserted into the thermometer inserting hole 110 and into which the thermometer 1000 is enclosedly inserted, and the reference material 2000 representing a reference temperature on the basis of a phase transition is enclosed and sealed in the reference material inserting hole 120.

A thermocouple thermometer 1000 or an industrial platinum resistance thermometer 1000 is suitable as a thermometer to be calibrated by the thermometer 1000 calibration apparatus using the multi fixed-point cell 100 for calibrating a thermometer according to the present invention, and a lead line is connected to the industrial platinum resistance thermometer 1000 thereby capable of measuring temperature on the basis of a signal of the lead line.

The external tub 200 is enclosedly inserted into the temperature control means 300 and an electric furnace may be used as the temperature control means 300. Further, the temperature control means 300 is preferably easy to move and to control temperature and there is no limitation in kind thereof if it is possible to control temperature.

The multi fixed-point cell 100 is heated by the temperature control means 300, then the reference material 2000 inserted into the reference material inserting hole 120 is heated thereby proceeding phase transition. At this time, a constant temperature section is formed in a phase transition section in which two-phase or three-phase coexist and a calibrational operation is carried out by comparing a temperature measured by the thermometer 1000 with an identical phase transition temperature of a metal.

In addition, in the case of calibrational operation of the thermometer 1000, a melting point temperature of the reference material 2000 may be used by heating the reference material 2000 and a freezing point temperature of the reference material 2000 may also be used by cooling again the reference material 2000.

The computer 500 compares a difference between a phase transition temperature of each reference material 2000 and a temperature measured by the thermometer 1000 in the constant temperature section according to a phase transition of the reference material 2000, stores the measured value and decides error of the thermometer 1000 using a predetermined reference value.

The radiation blocking plate 220 is a structure for blocking influence of radiant heat to the thermometer 1000, and as shown a plurality of radiation blocking plates 220 are stacked and may be provided as an integrated type.

It is preferable that the gas regulating part 230 is further provided so as to maintain an inside of the external tub 200 in a vacuum state, or inert gas which is stable is injected into the inside of the external tub 200 thereby surely preventing damage due to oxidization of the reference material.

The radiant heat from an outside can be blocked and oxidization of the reference material can be prevented as the radiation blocking plate 220 and the gas regulating part 230 is further provided, whereby more accurate calibrational operation can be carried out.

INDUSTRIAL APPLICABILITY

As described above, the multi fixed-point cell for calibrating thermometer and the thermometer calibration apparatus using the same according to the present invention have advantages that calibration can be carried out in wide temperature region and in accurate by using the multi fixed-point cell for calibrating thermometer in which a thermometer inserting hole is formed and at least two reference material inserting holes into which reference materials having different phase transition temperature are enclosed respectively are formed so as to be spaced apart.

Further, the multi fixed-point cell for calibrating thermometer and the thermometer calibration apparatus using the same according to the present invention have advantages that efficiency of the calibrational operation can be increased and industrial loss due to the calibrational operation can be minimized as time and cost taken for the calibrational operation can be decreased.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A thermometer calibration apparatus using a multi fixed-point cell for calibrating a thermometer, comprising:

an external tub provided with a lid;

a multi fixed-point cell for calibrating a thermometer enclosedly inserted into the external tub and having a thermometer inserting hole at one side and in which an internal tub is contactably inserted, the multi fixed-point cell having a thermal relationship with respect to the internal tub, and at least two reference material holes, in which reference materials having different phase transition temperatures are sealingly enclosed, formed on a same plane as that of the thermometer inserting hole so as to be spaced apart from each other;

the thermometer enclosedly inserted into the internal tub;

a temperature control means for heating or cooling the external tub which is introduced therein so as to derive the phase transition;

a temperature display part connected to the thermometer, for displaying a temperature measured by the thermometer; and a computer connected to the thermometer, for comparing and storing a difference between a reference temperature of each reference material and a temperature measured by the thermometer in a constant temperature section according to the phase transition of the reference material, and deciding error of the thermometer according to the difference between the two.

2. The thermometer calibration apparatus using a multi fixed-point cell for calibrating a thermometer as set forth in claim 1, further comprising a radiation blocking plate which is provided around the inner tub inside of the external tub and blocks heat transferred to the thermometer.

3. The thermometer calibration apparatus using a multi fixed-point cell for calibrating a thermometer as set forth in claim 1, further comprising a gas regulating part which is provided at a side of the external tub and supplies or discharges gas.

4. The thermometer calibration apparatus using a multi fixed-point cell for calibrating a thermometer as set forth in claim 3, wherein the gas is an inert gas.

* * * * *